June 21, 1938.  J. F. ARTHUR  2,120,960
CUTTING DEVICE
Filed July 2, 1936  2 Sheets-Sheet 1
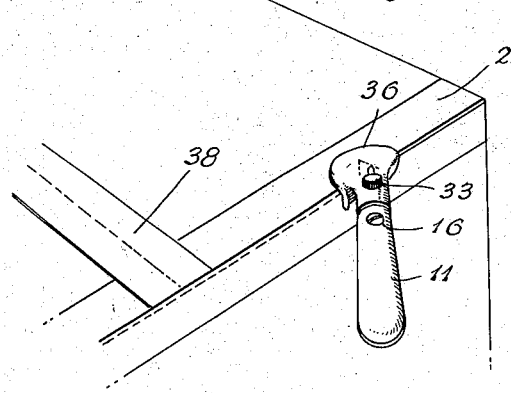
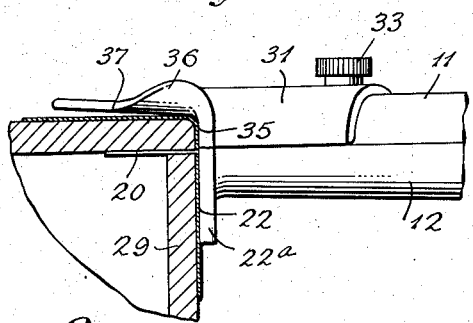
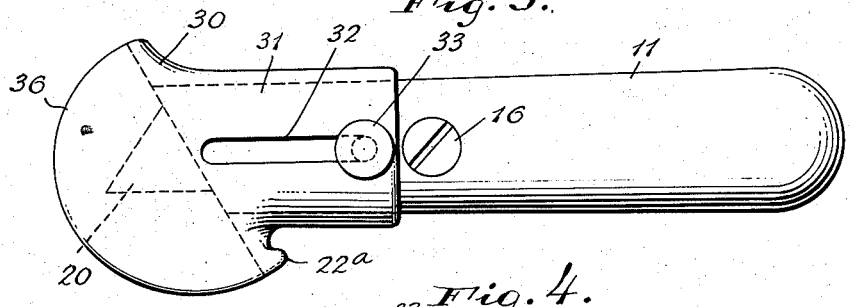
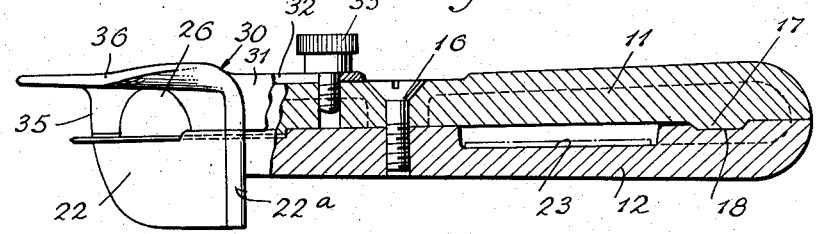
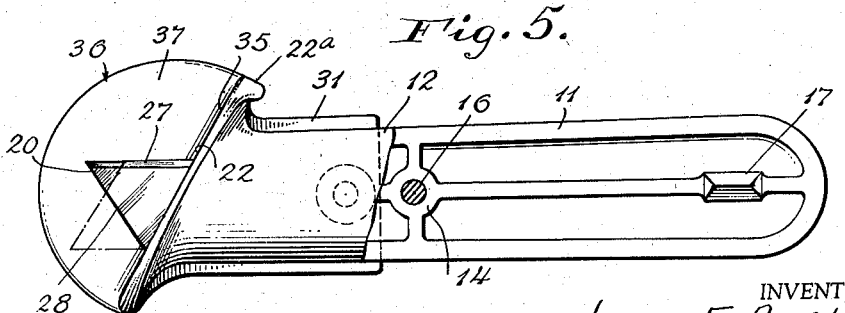
INVENTOR.
JAMES F. ARTHUR
BY
ATTORNEYS

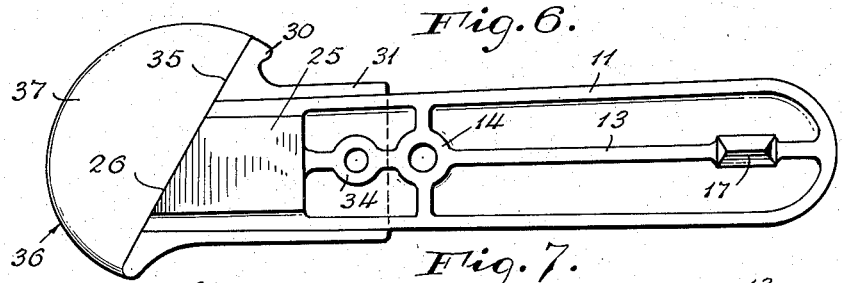
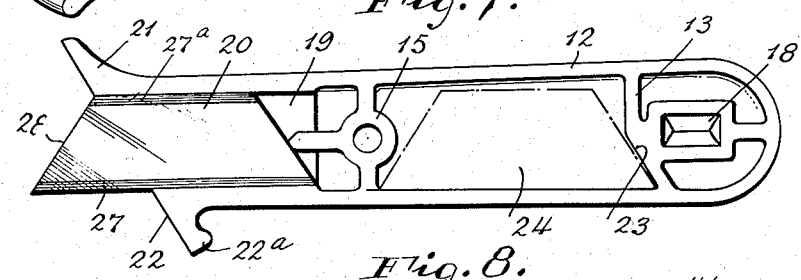
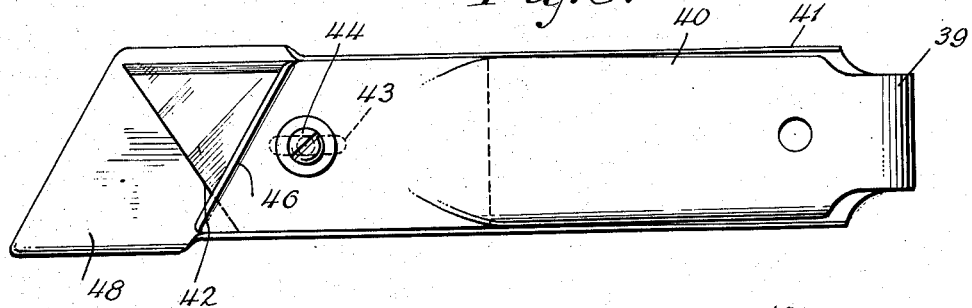
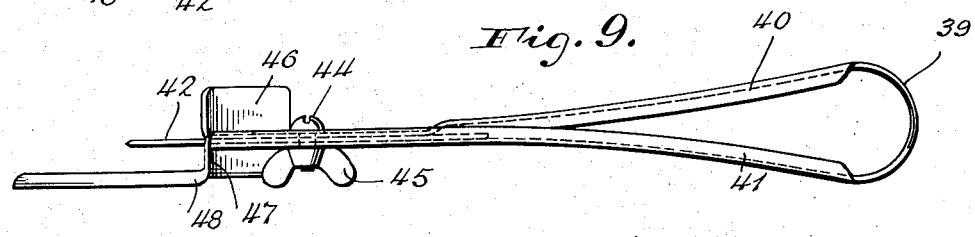
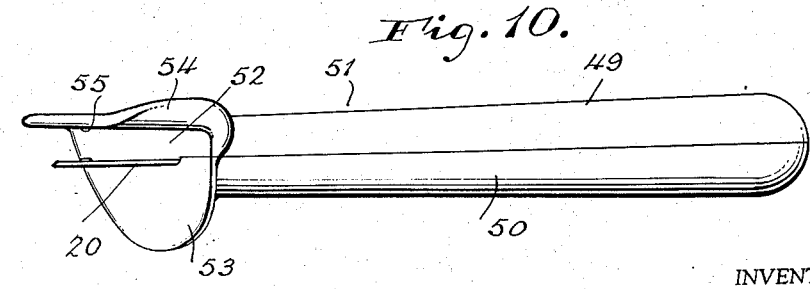

Patented June 21, 1938

2,120,960

UNITED STATES PATENT OFFICE 2,120,960

CUTTING DEVICE

James F. Arthur, Dickson, Pa.

Application July 2, 1936, Serial No. 88,514

7 Claims. (Cl. 30—2)

This invention relates to improvements in cutting implements and has particular reference to a device especially suitable for opening cartons made of fibre board and like material.

An object of the invention is to provide an improved cutter of simple and practical construction wherein a cutting blade is so disposed relative to intersecting guide surfaces therefor that the device may be applied to the meeting edges of surfaces of a carton and guided in its movements relative thereto so as to effectually cut the carton adjacent said edges and, in so doing, avoid excessive penetration of the cutting blade into the carton which might otherwise damage the contents thereof.

Another object is to provide the device with a reversible blade having cutting edges arranged so that one of them will extend in the longitudinal direction of the handle of the device when the blade is in one position, while another cutting edge will extend in a similar manner relative to a guide surface for the blade when the latter is in a reversible position.

A further object is to provide the handle of the device and its cutting blade with a guard which is adjustable on the handle to operative and inoperative positions relative to said blade so that the latter may be employed either with or without the guard when cutting various portions of a carton.

The above and other objects will appear more clearly from the following detailed description when taken in connection with the accompanying drawings which illustrate preferred embodiments of the inventive idea.

In the drawings:

Figure 1 is a perspective view illustrating one application of one form of the invention to a carton.

Figure 2 is an enlarged fragmentary edge elevation of the device showing the same in the cutting position of Figure 1.

Figure 3 is a top plan view of the device as shown in Figure 1.

Figure 4 is a partial longitudinal section and elevation of the device.

Figure 5 is a bottom plan view, partly broken away.

Figure 6 is a plan view of the interior of one of the handle sections with a guard member attached thereto.

Figure 7 is a similar view of the other section, with the cutting blade in position.

Figure 8 is an elevation of another form of cutting device constructed in accordance with the invention.

Figure 9 is an edge elevation thereof, and

Figure 10 is an edge elevation of still another form of the device.

Referring more particularly to Figures 1 to 7 inclusive, the device herein shown may consist of two handle sections 11 and 12 which may be cast of aluminum or other suitable material, and each of which is of hollow construction with interior ribs 13 forming reenforcements therefor. The sections 11 and 12 are provided intermediate their ends with bosses 14 and 15 which align with each other when the sections are placed one on the other and which receive a fastening screw 16 to secure them together. The section 11 may also be provided with a lug 17 engageable in a recess 18 in the section 12 to assist in maintaining the sections in cooperative relation. At the inner end of the section 12, the same is provided with a recess or depression 19 adapted to receive a cutting blade 20 and the adjacent extremity of said section, beyond which a portion of the cutting blade extends when the same is in position in its recess, is enlarged as indicated at 21 and formed with a substantially flat guiding surface 22 which extends obliquely to the longitudinal axis of the section and which is provided with a straight edge 22ª to assist in guiding the device and prevent it from wobbling in the hand during certain cutting operations. A recess 23 may be formed in an intermediate portion of the section 12 by the re-enforcing ribs 13 to afford a space in which a spare or reserve cutting blade 24 may be kept until such time when it is desired to replace the blade 20.

The handle section 11 is provided at its inner end with a flat projecting portion 25 disposed in opposed relation to the cutting blade 20, when the sections are assembled, so as to engage and frictionally retain said blade in its proper position when the sections 11 and 12 are secured together by the screw 16. The portion 25 terminates at the inner extremity of the section 11 which is also formed into an oblique guiding surface 26 that aligns with the surface 22 of the section 12 when the elements of the device are assembled.

The cutting blade 20 is preferably of trapezoidal form and is provided along its longitudinal edges with cutting edges 27 and 27ª, while one of its diagonal ends has a similar cutting edge 28. When the blade is to be used for cutting a carton or the like, the same is placed in the position of Figure 7 with the cutting edge 27 extending in the direction of the longitudinal axis of the handle of the device and with the portion thereof extending beyond the combined surfaces 22 and 26 disposed at an obtuse angle relative to thereto. Thus when the blade is made to penetrate a wall of the carton 39 (Figure 1) and the surfaces 22 and 26 are engaged against said wall the position of the cutting blade will be such that when the device is moved along the wall the cutting edge 27 will produce a shearing action upon the material of the carton, as distinguished from a straight cut. In placing the device in position preparatory to a cutting operation, the surfaces 22 and 26 first limit the degree of penetration of the knife through the wall of the carton and will thereafter guide the blade in its cutting movement. The construction of the blade 20 is such that the same may also be used for scraping purposes, as when it is desired to remove labels from a carton. For this purpose, the blade is inverted or reversed from its position of Figure 7, whereupon the cutting edge 28 thereof will extend substantially parallel to the surfaces 22 and 26 and said edge may then readily be used to scrape or cut a surface. Also with the blade in the latter position, the cutting edge 27a may be employed to cut heavy material.

As a further means for guiding the blade 20 in some of its cutting operations the section 11 carries a guard member generally indicated by the numeral 30 and consisting of a shank 31 of an arcuate contour to snugly fit against said section so as to partially embrace the handle, and said shank is provided with a longitudinally extending slot 32 through which projects a set screw 33 threaded into a boss 34 formed in said handle section. Said slot permits of movement of the guard member longitudinally of the handle to operative and inoperative positions thereon and the set screw 33 is utilized to secure said member in such positions. The outer end of the shank 31 merges into an enlarged portion of the guard member which is provided with an obliquely extending guide surface 35 which aligns with the surfaces 22 and 26 when the guard member is in its operative position with respect to the blade 20. Extending from the surface 35 of the member 30 is a guard portion 36 which overhangs the cutting blade 20 in spaced parallel relation thereto and which presents another guiding surface 37 intersecting the surface 35 and spaced a distance from the blade 20 sufficient to receive therebetween a wall of a carton of ordinary thickness so that when the device is operated the blade will cut an adjacent wall of said carton at a point contiguous to the first-named wall, as best illustrated in Figure 2. Thus the surfaces 22, 26, 35 and 37 cooperate to maintain the blade at a proper depth during the cutting operation and to guide said blade along a straight line when the device is moved along the meeting edges of two walls of a carton. Instead of opening the carton in the manner just described, it may sometimes be desirable to sever the securing tape 38 (Figure 1) secured to the meeting edges of the cover flaps of a carton. In this instance the guard member 30 is first adjusted along the handle of the device until the free edge of the guard portion 36 has been moved to a point inwardly of the aligned surfaces 22 and 26 so that the projecting portion of the cutting blade will be completely exposed. The blade may then be made to penetrate the tape 38 between the meeting edges of the cover flaps of the carton until the surfaces 22 and 26 are in contact with said flaps. The handle will then be deposited in a diagonal position relative to the plane of said flaps and by driving the device along the strip 38 the cutting edge 27 will produce a shearing action to sever said tape.

In the form of the invention shown in Figures 8 and 9, the device is preferably formed of a single elongated strip of metal having a degree of resiliency. At an intermediate point said strip is reduced and bent upon itself as indicated at 39 to form the two handle sections 40 and 41. The end portions of the sections 40 and 41 are brought together in abutting relation and are adapted to receive therebetween a cutting blade 42 of the same construction as the blade 20, with the exception that the former is provided therein with a longitudinal slot 43 which permits of longitudinal adjustment of the blade relative to the handle sections. This slot receives a screw 44 that projects through the sections 40, 41 and is provided with a wing nut 45 by means of which the handle sections may be tightened together to securely hold the cutting blade in position.

The free end of the handle section 40 is bent transversely on a diagonal line to provide a laterally extending and obliquely disposed guiding flange 46 which is the equivalent of the guiding surface 22 of the previously described form of the invention. The free end of the handle section 41 is likewise bent laterally to provide the obliquely extending guide flange 47 which is aligned with the flange 46, and from which extends the guard member 48 disposed in spaced parallel relation to the cutting blade 42 and being the equivalent of the guide portion 36 of the first modification.

The device of Figure 10 is quite similar in construction to that illustrated in Figures 1 to 7 in that it comprises the separable handle sections 49 and 50 secured together by a screw 51 and provided at their ends with the obliquely extending guide surfaces 52 and 53 respectively from which projects the cutting blade 20 held between said handle sections. The guard member 54 having its guide surface 55 is likewise similar to the guard member 30 except that the former member has no shank but is simply formed integrally with the handle section 49, thus eliminating the adjustable feature of guard member along the section as previously described.

What is claimed is:

1. In combination, a cutting device having a handle provided with a guiding surface extending obliquely to the longitudinal axis of said handle, and a blade reversibly mounted on said handle and having angularly disposed cutting edges one of which extends parallel to said axis in one position of the blade, while the other edge assumes a similar position relative to said guiding surface when the blade is reversed.

2. In combination, a cutting device having a handle provided with intersecting guide surfaces the planes of which are substantially right angularly disposed, with one of said surfaces extending obliquely relative to said handle, a reversible blade, projecting from an intermediate portion of the latter surface in spaced parallel relation to the other surface and having angularly disposed cutting edges one of which is parallel to the longitudinal axis of said handle in one position of the blade while the other edge assumes a similar position relative to said obliquely extending surface when the blade is reversed, and means to secure the blade to the handle in either of its positions.

3. In combination a cutting device comprising a handle one end of which constitutes a guiding surface, a blade carried by said handle and projecting from said surface, and a guard member mounted for movements relative to said handle to positions wherein a portion of said member is extended outwardly in overhanging relation to said blade and also inwardly of said guiding surface, and means to so mount said guard member.

4. In combination, a cutting device comprising a handle one end of which constitutes a guiding surface for engagement with a wall of a carton or the like, a blade carried by said handle and projecting from said surface, a guard member adjustable longitudinally of said handle to a position overhanging said blade and also to a position inwardly of said guiding surface, said member having a shank partially embracing said handle and further having a guard portion provided with a guide surface which coacts with the first-named surface in guiding said blade, said shank having a slot therein, and means engaging in said slot to guide said guard member to its operative position in overhanging relation to said blade and to its inoperative position in which the outer extremity of said guard portion is located inwardly of the first-named surface.

5. In combination, a cutting device comprising a pair of separable interengaging handle sections one of which is provided therein with a recess and the other with an opposed projection fitting into said recess, said sections combining at one end of the handle to form an obliquely disposed guiding surface, a cutting blade disposed in said recess and having a portion extending beyond said surface and being engaged by said projection, said blade being reversible in said recess and having angularly disposed cutting edges one of which is parallel to the longitudinal axis of said handle in either position of the blade while the other cutting edge extends parallel to said oblique surface when the blade is in one of its positions, and a guard member for said blade carried by one of said handle sections and having a guiding surface cooperating with the first-named surface to guide said blade during a cutting operation.

6. In combination, a cutting device formed from an elongated strip of resilient material bent intermediate its ends to provide handle sections the free ends of which are bent laterally and in the same plane to form a guide surface, a cutting blade projecting beyond said surface from between said handle sections, and a guard member formed on one of said bent ends and extending in overhanging spaced relation to the projecting portion of said blade.

7. In combination, a cutting device comprising a pair of cooperating handle sections one of which is provided with a recess extending longitudinally to one end thereof, and the other section provided with an opposed projection fitting into said recess, the sections at the ends thereof adjacent said recess and projection combining to form a single guide surface extending laterally relative to said recess and projection, a cutting blade disposed in said recess and held therein by said projection and having a portion extending beyond said guide surface, and a guard member on one of said sections having a guide surface cooperating with the first-named surface in guiding said blade during a cutting operation.

JAMES F. ARTHUR.